Sept. 7, 1926. 1,599,274
J. E. BICKNELL ET AL
MACHINE FOR PLASTIC CLAY WORKING
Filed Oct. 17, 1923 3 Sheets-Sheet 1
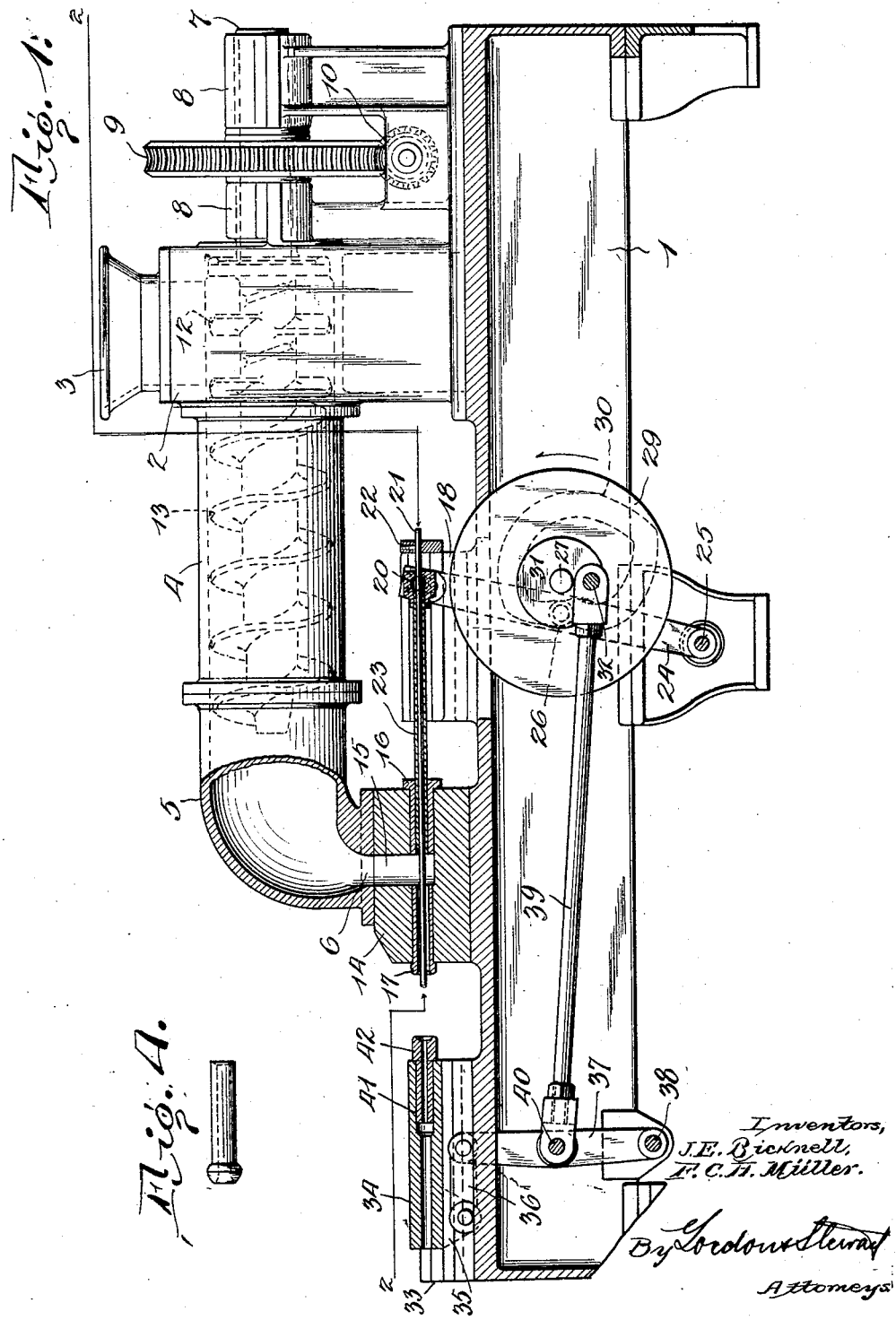

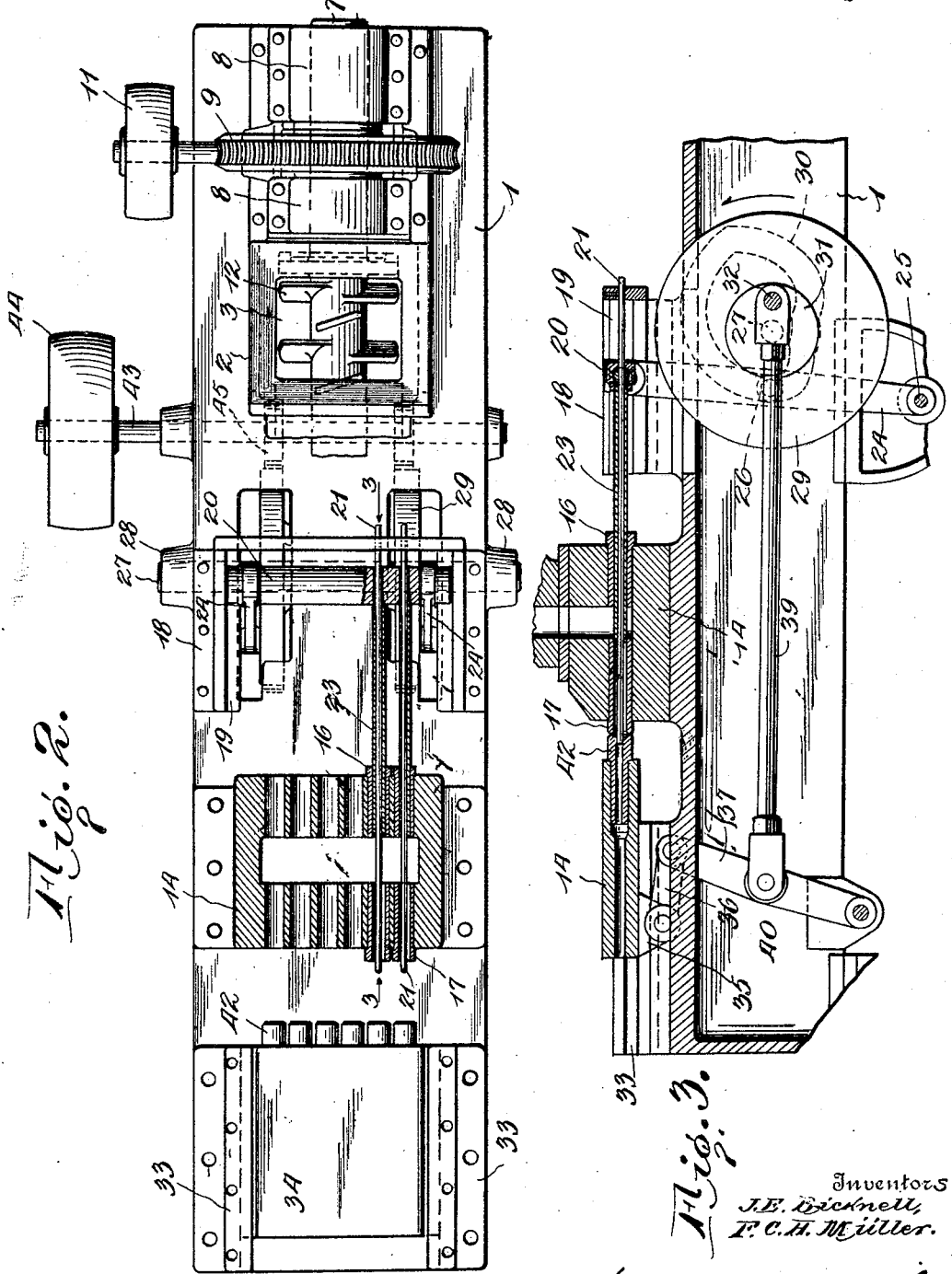

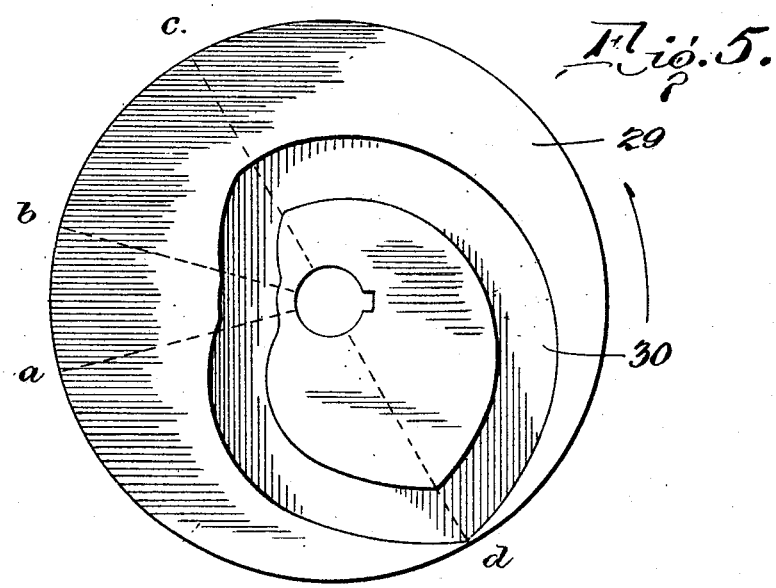
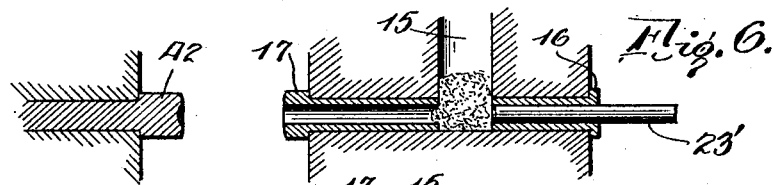
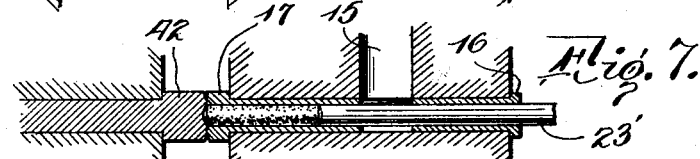
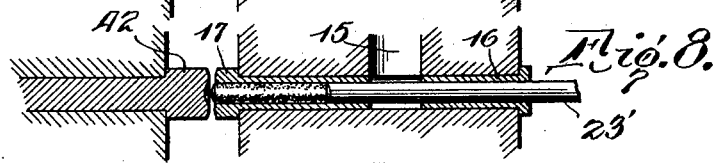
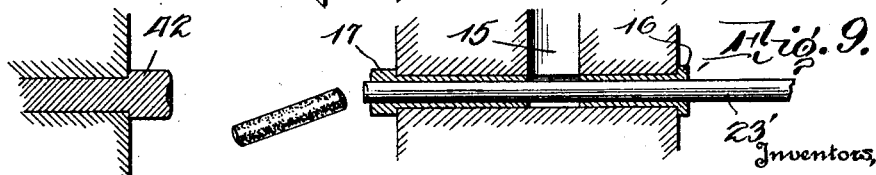

Patented Sept. 7, 1926.

1,599,274

UNITED STATES PATENT OFFICE.

JOHN E. BICKNELL AND FERDINAND C. H. MÜLLER, OF FINDLAY, OHIO, ASSIGNORS TO FINDLAY ELECTRIC PORCELAIN COMPANY, OF FINDLAY, OHIO, A CORPORATION.

MACHINE FOR PLASTIC-CLAY WORKING.

Application filed October 17, 1923. Serial No. 669,160.

The production of articles from material in plastic condition, for example, molded or formed clay products, which become vitrified porcelain or the like on firing, is generally carried out by a multiplicity of operating steps. For example, electric porcelain ware is customarily manufactured by suitably compounding the raw materials into a slip from which the excess water is removed by a filter press. The resulting cakes of material are permitted to mature before further manipulation.

The actual forming of the articles is accomplished in one of two ways. According to the dry process the matured filter press cakes are broken up in a disintegrator to produce small particles of moist clay. This moist material will not flow into a mold but must be filled in and then the individual articles formed by a screw-operated die. The articles from the mold are permitted to dry further and then are fired. Due to this manner of working, the articles, in the course of manufacture, are of relatively open texture and readily friable. After firing, the porcelain is still of relatively open texture and is frequently found not to be uniform throughout the article.

According to the wet process the press cakes are fed into the hopper of a molding machine from which the material is extruded in rods, tubes, blocks or the like which are then cut off into requisite lengths for further manipulation. The percentage of moisture contained in the press cakes is such as to prevent the material extruded from retaining the shape given it without prompt drying. In fact the material becomes distorted readily on operation unless great care is taken in handling. The final shape is given the articles from the extruding press, after partly drying, and in finishing dies.

It is an object of our invention to form articles from plastic material such as electric porcelain ware by a wet process which avoids much of the care now required in the manufacture of these articles, and eliminates a number of intermediate hand operations. Articles manufactured in this improved fashion are of uniform density, exceeding that customarily found and there results consequently improvement in the character of the articles.

Specifically the improvement resides in the production of the articles from plastic clay directly from the moist material into the final form and without intermediate drying or molding in more than a single operation.

While this improved method is applicable to articles of any given shape which it is possible to make by a plurality of approaching and receding dies, we have shown it as specifically applied to the problem of manufacturing headed insulating porcelain tubes. Formerly it has been necessary to produce such tubes in an extrusion press such as has been described above followed by a drying step, after which the tubes are cut to size and finished by being headed by a die. In place of the numerous hand manipulations previously found necessary we are enabled to produce these articles directly from the mass of raw material and without the intervention of the operator's hand or an intermediate drying step.

As illustrative of the apparatus forming one embodiment of our invention there is shown such a machine in the accompanying drawings, in which:

Figure 1 is an elevation partly in longitudinal section of an extruder,

Fig. 2 is a plan view partly in section taken on the line 2—2 of Fig. 1,

Fig. 3 is a longitudinal section on the line 3—3 in Fig. 2 and showing the plunger at the opposite extreme of limit, Fig. 4 is a side view of a headed insulating tube produced, Fig. 5 is a side view of the cam, and Figs. 6–9 inclusive are diagrammatic views of a molding apparatus showing the several consecutive steps in the process.

A table or other support 1 serves as a mounting for the several parts of the machine. Near one end of the table is mounted a hopper 2 having an inlet 3. Attached to an opening in one side of the hopper 2 is a cylindrical barrel 4 which terminates in a pressure chamber 5. This chamber has a downwardly extending outlet 6. A shaft 7 passes through the hopper 2 and the barrel 4 and is journaled in supports 8, 8. A driven gear 9 is keyed to shaft 7 and is operated by worm 10, likewise journaled for rotation by pulley wheel 11.

That portion of the shaft 7 which passes through hopper 2 carries a plurality of blades 12 while a helical screw 13 is carried by the shaft within the barrel 4. The periphery of screw 13 approaches the inside wall of barrel 4 but permits a certain portion of the material to pass therebetween by reason of the back pressure from the material in the pressure chamber 5.

Block 14 mounted on table 1 has a vertical passageway 15 in registry with outlet 6. Horizontally through the block 14 is disposed a bushing 16 and a stationary die 17. Bushing 16 and die 17 are concentric and spaced one from the other by the passageway 15. Both members are firmly held in block 14 by any conventional means. Bushing 16 and die 17 are channeled axially as indicated in Fig. 1 to receive the forming members to be described later. The block 14 is shown to provide six forming units as that above set out, although the number may be increased or diminished according as desired.

A casting 18 forms part of the table 1 between hopper 2 and block 14. This casting is channeled as at 19 to form a track in which is reciprocated a cross-head 20. This cross-head is drilled horizontally in line with the channels in members 16 and 17 and a centering rod 21 passes through 16, 17, 20 and the rear portion of casting 18, being anchored in the last named as indicated at 22 in Fig. 1.

A sleeve 23 is journaled in the channels of members 16 and 17, and is held at one end by a screw-threaded connection in cross-head 20. Sleeve 23 is journaled on centering pin 21 and fits snugly between the pin and members 16 and 17.

The opposite ends of cross-arm 20 have a sliding bearing in links 24, 24 which are pivoted from a cross shaft 25 in the lower part of table 1. Midway in lever 24 is found a lateral pin 26 constituting a traveler.

A cross shaft 27 is journaled at 28 transversely of table 1 and carries two wheels 29. A cam track 30 in each wheel 29 forms the track for the traveler 26, by which the cross-head 20 and sleeves 23 are caused to reciprocate in certain well-defined movements as will be described. A crank 31 is formed in the shaft 27 to form an eccentric bearing 32.

At the remote end of table 1 is mounted a pair of guide tracks 33, 33, between which slides a carriage 34. This carriage has a depending ear 35 to which is pivoted a link 36. A lever 37 is mounted for pivotal movement from shaft 38 on table 1. The upper end of lever 37 is connected to the free end of link 36. An arm 39 connects the eccentric bearing 32 with pivot 40 mounted midway on lever 37.

Carriage 34 is drilled longitudinally as at 41 to receive a series of heading dies 42, one of which is disposed opposite each die 17. The heading dies 42 have an axial hole adapted to receive the end of centering pin 21. The proximate ends of dies 17 and 42 may be given any desired configuration for forming the head of the completed article.

As shown in Fig. 5 the cam track 30 is constructed to provide certain definite movements of the sleeve 23. Beginning at point $a$, the rotation of the cam in the direction shown by the arrow provides for a dwell of the traveller 26 and consequently of the sleeve 23 at its right limit of movement, shown in Fig. 1. This occurs until the traveller reaches point $b$, whereupon the traveller and the sleeve 23 are advanced abruptly to point $c$ accomplishing a closure of passageway 15, and an initial compression of the material in the mold, the end of sleeve 23 being received within die 17. This brings the parts into the position shown in Fig. 3. The sleeve 23 is now gradually advanced within the die for an ejecting stroke during the travel of the traveler 26 from the point $c$ to point $d$. Continued rotation of the cam restricts the sleeve 23 to the opposite limit of travel while the traveler is passing from $d$ to $a$.

From Figs. 1 and 2 it will be noted that similarly the crank 32 serves to advance and retract the heading die 42. The heading die is in an intermediate position during the retracted dwell of sleeve 23, is advanced to closing the mold formed by the two heading dies and the sleeve 23 during the compression stroke of the sleeve; die 42 is retracted in advance of the article as the same is ejected by sleeve 23 and reaches its rearward limit of travel far enough in advance to permit the completed article to be pushed off the centering pin 21 and received on a conveyer, not shown. The retracting movement of the sleeve 23 is accompanied by an advance of die 42 to its intermediate position from which the cycle was begun.

The success of this method depends in great part upon the proper preliminary treatment of the material as placed in the hopper. This material is in the condition normally found in the matured press cakes. In such condition the material is too stiff to be operated upon successfully by the ordinary extrusion press. As fed into the hopper, the material is at first broken up by the agitation of the blades 12 which break down the large lumps and feed the material forward where it can be worked by the screw-thread 13. As the material is fed forward by the latter, it accumulates in the pressure chamber 5 and creates a back pressure, which allows a large proportion of the material to slip over the periphery of the screw-thread 13. Experience has demonstrated the desirability that the material be discharged through the pressure chamber only one-third as fast as the normal rate of delivery of the screw-thread 13. This insures a continuous reworking or kneading of the material by the screw-thread 13 maintaining the material under pressure and in an intimate mixture which increases the density and cohesive character to a marked degree.

As a charge of this material passes through the passageway 15 it is still under considerable pressure and will flow readily into the die 17 until sleeve 23 cuts off the entry of further material. At this point the die 17 is practically filled with the material still under pressure due to the resistance of the die to the passage of the material. The compression caused by the approach of heading die 42 which cuts off excess of material escaping around heading die 17, and sleeve 23, serves to give the material the final form desired. Heading die 42 is retracted in a rapid stroke to clear the way for the discharge of the article from the press by the sleeve 23. As described above die 42 advances to an intermediate position during the complete retraction of sleeve 23. The latter in its movement permits an additional charge of material to fill dies 17. The several steps of this process have been indicated diagrammatically in Figs. 6-9, in which are shown bushing 16, heading dies 17 and 42, and a plunger 23'. The plunger is indicated as of circular cross section instead of the annular form utilized in making the tubes. It is obvious that the process is applicable to any article which may be made by compression between opposed dies. In Fig. 6 plunger 23' is in its retracted dwell, permitting material under pressure to be forced within the die 17. The forward movement of plunger 23' closes die 17 (Fig. 7) and compresses the contained material against die 42 which has advanced into contact with die 17, thus pressing out excess material and forming the front end of the article. As this material has at all times been under uniform compression, the article formed is of uniform density exceeding any obtainable by drying process and favorably comparable with the wet process.

In Fig. 8, die 42 is shown to have begun its retracting movement in advance of the ejecting stroke of plunger 23'. Die 42 has reached its retracted limit in Fig. 9 at the moment when the article is ejected from die 17 by plunger 23' in its advanced position as shown. As soon as the article is ejected, plunger 23' and die 42 are returned to the positions shown in Fig. 6. A countershaft 43 receives power through pulley belt 44 and is geared by means of gears 45 to the periphery of cam wheels 29.

In this manner it has been found possible to perform in one machine the several separate steps necessary in the production of the plastic earthenware articles directly from the materials and without intermediate drying treatment or handling. The articles produced are free from distortion as the compression used is uniform and the material evenly distributed. The danger to the operator is completely removed since the operator is not relied upon in placing the material or removing the product. This avoids all possibility of irregular articles or waste due to breakage, while the molded articles are well-adapted for firing without further treatment.

Articles of diverse form and character may be formed by the proper selection of dies, the main factor being the preparation of the material in a uniform mass and under compression and the consequent molding into a product denser and more uniform than can be accomplished by either the present known wet or dry processes.

What we claim is:

1. In an apparatus of the class described, a hopper having continuously rotating means therein for disintegrating pulverulent material a cylindrical chamber adjacent said hopper, a continuously operating screw located within said chamber and having a sufficient clearance between itself and the walls of said cylindrical chamber to permit a passage of the disintegrated pulverulent material under pressure, a mold adapted to receive the material from said chamber while still under pressure, a plunger to travel against the material and separate it from the material being worked, an opposite die for completing the molding of the article, means to retract the last-named die and means to eject the article from the mold.

2. In an apparatus of the class described, means for disintegrating material, means for working the same under pressure, a mold adapted to receive the material while still under pressure, a core pin within the mold, a sleeve journaled on the core pin, a die adapted to close the mold, and means for reciprocating the die and for causing the sleeve to reciprocate on the core pin.

3. In an apparatus of the class described, means for disintegrating material, means for working the same under pressure, a mold adapted to receive the material while still under pressure, a core pin passing through the mold, a sleeve slidable on the core pin, a die adapted to close the mold, operating means for reciprocating the die and means for causing the sleeve to cut off the supply of material, to compress the material in the mold, to eject the finished article and to admit a fresh charge of material to the mold in the order named.

4. In an apparatus of the class described, a hopper having continuously rotating means therein for disintegrating pulverulent material a cylindrical chamber adjacent said hopper, a continuously operating screw located within said chamber and having a sufficient clearance between itself and the walls of said cylindrical chamber to permit a passage of the disintegrated pulverulent material under pressure, a mold adapted to receive the material while still under pressure, opposed dies, means causing the said dies to approach each other and compress the material in the mold, and means to cause one of said dies to recede from the mold as the opposite die is ejecting the completed article from the mold.

In testimony whereof, we have hereunto affixed our signatures.

JOHN E. BICKNELL.
FERDINAND C. H. MÜLLER.